July 14, 1970  C. H. PICOU  3,520,611
METHOD AND MEANS FOR INCORPORATING A THEODOLITE
OR A TACHYMETER WITH A TELEMETER OR THE LIKE
DISTANCE-MEASURING APPARATUS Filed Dec. 23, 1966  2 Sheets-Sheet 1

United States Patent Office 3,520,611
Patented July 14, 1970

3,520,611
METHOD AND MEANS FOR INCORPORATING A THEODOLITE OR A TACHYMETER WITH A TELEMETER OR THE LIKE DISTANCE-MEASURING APPARATUS
Claude H. Picou, Paris, France, assignor to Societe d'Etudes, Recherches et Constructions Electroniques (S.E.R.C.E.L.), Montrouge, Seine, France
Filed Dec. 23, 1966, Ser. No. 604,210
Claims priority, application France, Jan. 10, 1966, 45,296
Int. Cl. G01c 3/08
U.S. Cl. 356—72                              5 Claims

ABSTRACT OF THE DISCLOSURE

A combined theodolite and telemeter is provided with a telemetric transmitting station and a telemetric receiving station rigid with the transmitting station in side-by-side parallel relationship, the stations being adapted to pivot as to sight around an axis perpendicularly crossing the parallel longitudinal axes of the two stations, each station having a reflecting surface lying substantially at 45° with reference to the longitudinal axis thereof, luminous rays being conveyed into the transmitting station along said pivotal axis to be transmitted by the reflecting surface in said transmitting station along the longitudinal axis thereof and reflected at a remote point onto the reflecting surface of the receiving station, the duration of travel of said rays defining the distance of the remote point, the reflecting surface in one of the stations being displaceable into a collapsed inoperative position to allow said one station to operate as a theodolite.

---

It is a well-known fact that it is possible to measure distances with high accuracy by measuring the duration of travel of a luminous or infra-red electromagnetic wave transmitted from a point at one end of said distance and reflected by a reflector located at the other end, so as to be received at a point adjacent the point from which the wave has been transmitted.

The measurement of the distance is executed through the measurement of the difference in phase of a voltage which serves for the modulation of the intensity of the radiated waves. Applicant has already disclosed for instance such a system for a distance-measuring method and means in the French patent application filed under the name of Société d'Etudes Recherches & Constructions Electroniques SERCEL on Oct. 29, 1965, under prov. No. 36,639 and entitled "Improvements in Electromagnetic Telemetric Operations" the inventor being the same as for the present invention. The apparatus used in the case illustrated in said patent application includes chiefly an optical transmitting station, an optical receiving station and associated electric means, the two optical stations being similar to those already used in situ by land surveyors for measuring angles or defining levels.

Now, it is of interest for many applications to use a single apparatus adapted to serve for measuring selectively angles and distances. In the case of the measurement of angles, the apparatus to be considered forms a theodolite or a tachymeter.

It is possible, of course, to arrange side by side on a common frame the sighting glass of a theodolite and the optical systems transmitting and receiving the telemetric signals, but this would lead to an expensive and heavy arrangement.

Now, according to the present invention, the above compound arrangement is simplified by making one of the optical systems play a double part, to wit: on the one hand its normal part which is that performed in a theodolite for the measurement of angles and on the other hand one of the parts performed in a telemeter for transmitting or receiving waves.

In the case to be considered hereinafter, i.e. that of the use of infra-red waves, there is normally used at the receiving end a photo-diode; now it is a well-known fact that the properties of a photo-diode vary with the intensity of the surrounding light and it is therefore essential with a view to obtaining a satisfactory result for said photo-diode to operate under an illumination as constant as possible.

For said reason and according to a further feature of the present invention, the part played by the optical system of the theodolite is associated with that played by the telemetric transmission system and is independent of the receiving system.

It is known furthermore that in a theodolite the sighting glass may revolve round a horizontal axis in order to allow a pointing as to sight or elevation,
round a vertical axis so as to allow pointing as to azimuth or bearing.

Consequently, it is possible, in accordance with a simple solution to locate the source of light, preferably a diode producing infra-red rays, and also the receiving photo-diode at the corresponding foci of the optical transmitting and receiving systems, which would mean of necessity the use of two pairs of electric joints, so as to allow on the one hand the movements as to sight and on the other hand the movements as to azimuth in the transmitting system.

Now, the presence of such joints would considerably increase the weight of the apparatus and would furthermore introduce errors in phase which would risk altering the measurement made.

In conformity with a further feature of the present invention, such electric joints are entirely cut out by an arrangement which allows securing permanently in a stationary position with reference to the apparatus frame both the wave-producing diode and the receiving photo-diode.

In order to reach such a result and according to a still further feature of the present invention, the transmitting optic system includes a mirror arranged at 45° with reference to the optical axis of the apparatus and allowing the latter to operate for telemetric purposes with visible or infra-red rays forming a conical beam the axis of which registers with the horizontal axis of rotation for training in sight, said beam being then returned by the mirror in the direction of the optical axis of the apparatus.

To this end, the optical axis of the telemetric transmitting system which forms also the optical axis of the theodolite crosses the horizontal axis of rotation for training in sight, while the reflecting plane of said mirror passes through the crossing point thus defined.

Furthermore, the optical receiving system includes a mirror lying permanently at 45° and returning the parallel suitably focused beam received as a conical beam the axis of which registers with the axis of rotation for training in sight.

To allow the use of the apparatus as a theodolite, the mirror of the transmitting section is collapsed into an inoperative position provided for such a use.

The above arrangement solves the problems of the joints required for the angular movements of training in sight. In order to cut out the joints required by the rotation for training in azimuth, the present invention provides, according to a further feature, the use of a pair of two deformable optical fibres of which one end is arranged coaxially with the horizontal axis of rotation for sight training, while the other end of each optical fibre is permanently secured to the frame to the apparatus; said fibres assume, in a neutral position, the shape of a beam which allows their deformation without any exaggerated straining when the two optical systems revolve for azimuth training by one revolution or slightly more round a vertical axis.

The invention including the features disclosed hereinabove together with further advantageous features will appear more clearly from the read of the following description of a preferred embodiment thereof, reference being made to the accompanying drawings wherein.

In said drawings, the same reference numbers designate the same parts.

Figure 1:
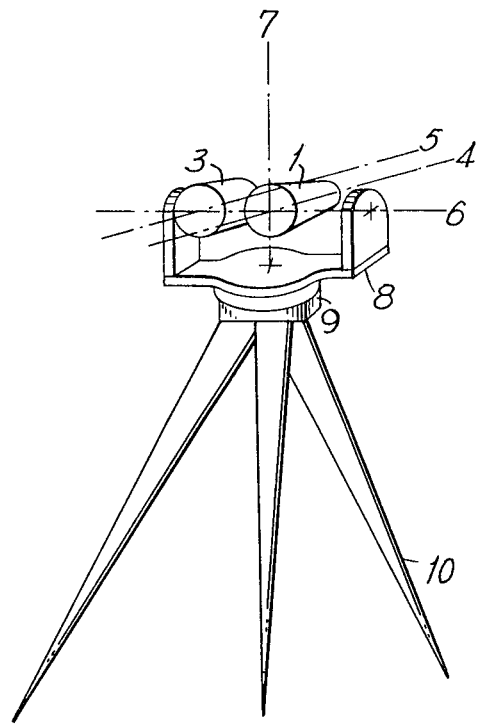
FIG. 1 is a diagrammatic general view of the apparatus.

The apparatus illustrated in FIG. 1 includes an optical system 1 acting both as an optical system forming part of a theodorite and as a transmitting system for a telemeter, the apparatus including further an optical system 3 forming the receiving optical system of the telemeter. Said two optical systems are permanently associated so as to form a single mechanical unit, the optical axes 4 and 5 of the two systems 1 and 4 being parallel.

The whole arrangement is carried by a tripod 10. In order to allow the movements required for training in sight, the mechanical system 1–3 can revolve round a horizontal axis 6 crossing the axes 4 and 5. To this end, the trunnions secured to the optical systems 1 and 3 are adapted to pivot in the arms of a stirrup 8 which may in its turn revolve round a vertical axis 7 extending preferably through the crossing point between the axes 4 and 6, over a frame 9 secured to the tripod 10.

Figure 2:
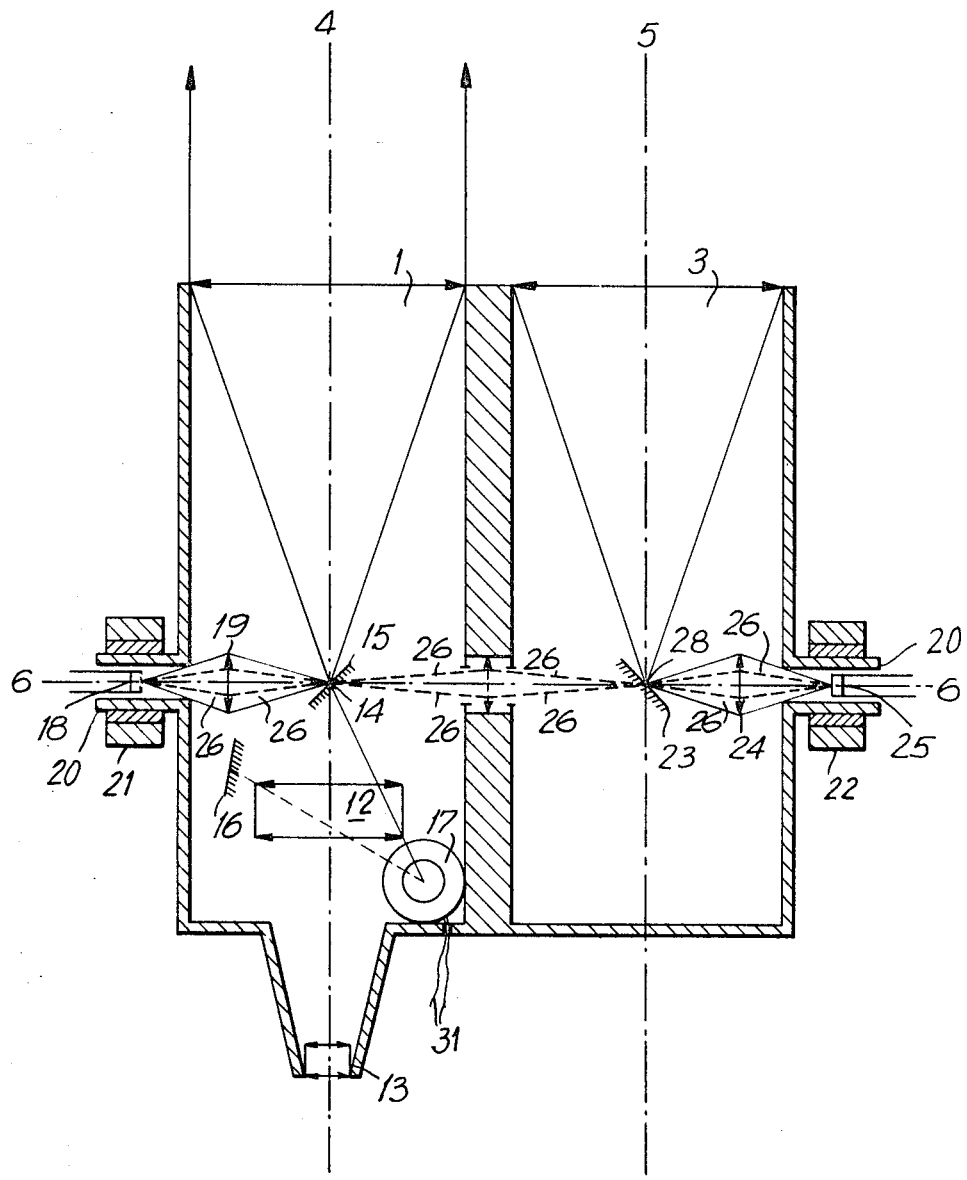
FIG. 2 is a cross-section through a plane containing the optical axes of the transmitting and receiving systems.

FIG. 2 shows again in cross-sectional view the transmitting system 1 and the receiving system 3. The receiving system 3 encloses a system of lenses at the focus of which is located a mirror 23 sloping at 45° and adapted to return the conical beam received as a beam the axis of which registers with the horizontal axis 6 provided for the rotation required for training in sight. A lens 24 collects this beam and makes it converge onto the end 25 of an optical fibre, which end is arranged coaxially with the axis 6. As illustrated, the unit constituted by the systems 1 and 3 can revolve round the common axis 6 of the trunnions 21, 22 so as to allow a training in sight. On the other hand, the transmitting system which serves also as an optical system for operation of the apparatus as a theodolite includes optical input means illustrated symbolically by the lens 11 while a lens-carrier 12 transmits the image obtained into an eye-piece 13.

A mirror 15 carried inside the transmitting system 1 is adapted to be collapsed into a position 16 when the apparatus is to serve as a theodolite and is returned into its position 14 corresponding to operation of the apparatus for telemetric purposes. To this end, the mirror 15 is carried by a light-weighted arm incorporated with the movable section of a galvanometer 17 the axis of rotation of which is perpendicular to the plane of the drawing. Said section of the galvanometer is governed electrically from the outside by current fed through yielding wires 31 passing at 30 through the casing enclosing the transmitting system. The use of such a control for the mirror cuts out the shocks which might arise in the case of a control by hand and would objectionably act on the accuracy of the apparatus. For telemetric purposes, the mirror 15 in its position 14 reflects the luminous beam emanating from the end 18 of an optical fibre, which end is coaxial with the axis 6 and acts thus as a source of light. The radiated waves are returned by an auxiliary optical means illustrated symbolically by the lens 19 onto the mirror 15 positioned at 14. The center of said mirror at 14 is the optically conjugate of the source of light formed at 18 with reference to the auxiliary optical means 19 and consequently the operation is the same as if the source of infra-red rays were located at 14, that is at the focus of the optical means 11, which leads to the production for telemetric purposes of a beam of parallel waves by the transmitting system 1.

It is thus apparent that for telemetric purposes the mirror 15 being in its operative position 14 instead of being collapsed, the source of light sends towards the sighting mark a beam of parallel rays which is reflected by the latter and returns onto the optical receiving system 3 at the focus of which a mirror is arranged which produces an image through the lens 24 at the end 25 of a corresponding optical fibre.

In contradistinction when the apparatus serves as a theodolite, the mirror 15 in the transmitting system is collapsed as shown at 16 and the system 1 operates as an ordinary theodolite since the lens 19 is located outside the cone formed by the luminous mean passing out of the lens 11 and reaching the lens-carrier 12.

Figure 3:
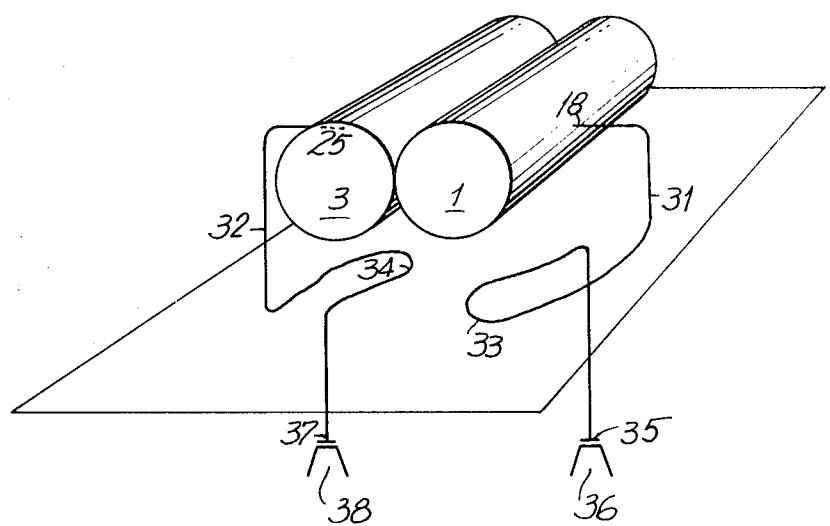
FIG. 3 is a diagrammatic view of the deformable optical fibres associated with said systems.

FIG. 3 illustrates diagrammatically the location of the optical fibres. The transmitting and receiving systems 1–3 are shown in said FIG. 3 in association with the ends 18 and 25 of the corresponding optical fibres. The optical fibre serving for transmitting purposes carries the reference number 31 and its end 18 is located on the rotary axis 6. Said fibre 31 includes a loop 33 and terminates at 35. Said end 35 is secured to the frame of the apparatus. 36 designates the transmitting photo-diode associated with said end 35.

On the other hand, the optical fibre serving for receiving purposes is shown at 32; it includes a loop 34 and terminates at 37. Said end is also secured to the apparatus frame.

38 designates the receiving photo-diode associated with said end 37.

It is also possible, as a modification, to cut out the optical fibres and set the diodes respectively at 18 and 25 on the rotary axis 6.

It is a well-known fact that in apparatus of such a type, it is essential to proceed, before any measurement of a distance, to a gauging of the apparatus, in order to make sure that the latter shows a zero distance for a luminous beam passing out of 18 and impinging directly on the opposite optical fibre 25.

According to an important feature of the invention, said gauging operation may be executed in a very simple manner by providing two small-sized openings in the casings of the optical systems 1 and 3, the centers of which openings are located on the rotary axis 6. It is also possible to insert in the gap separating the systems 1 and 3 a lens 27 which receives the luminous rays converging at 14 and makes them converge again at 25. In order to obtain the desired result, the mirror 23 is slightly transparent. For the gauging operation, the mirror 15 is of course in its collased position at 16.

It should be remarked that during said gauging operation the receiving photo-diode receives in the same manner as during the actual measurement, the ambient light from the sky section surrounding the sighting mark and consequently according to a last feature of the invention, the electric parameters of said photo-diode remain the same during the gauging and during the measuring operations.

In order to avoid, during the distance measuring operation, any light from reaching directly through the above-mentioned openings in casings 1 and 3, the end 25 of the fibre on the receiving side, the mirror 15 is given a size such that no luminous ray can pass directly through said openings which also act somewhat as baffles for the diffused light.

What I claim is:

1. A combined optical theodolite and phase shift telemeter including a fixed assembly and a movable assembly, said fixed assembly comprising a source of modulated luminous telemetric rays and detecting ray sensitive means, said movable assembly comprising a telemetric transmitting station and a telemetric receiving station lying side by side in parallel adjacent relationship, both stations being pivotably mounted to pivot around an axis perpendicularly crossing the parallel longitudinal axis of the two stations, each station comprising a reflecting system upon said pivotal axis, means conveying luminous rays into the transmitting station along said pivotal axis to be transmitted by the reflecting system in said transmitting station along the longitudinal axis thereof, means receiving along said pivotal axis the luminous rays transmitted by the transmitting station and reflected at a remote point onto the reflecting system of the receiving station, the duration of travel of said rays between the means conveying them and said receiving means defining the distance of said remote point, means providing an optical connection between said source and said conveying means and between said receiving means and said detecting ray sensitive means, and means to shift the reflecting system in one of the stations into a collapsed inoperative position to allow said one station to operate as a theodolite.

2. A combined theodolite and telemeter as claimed in claim 1, wherein said one station provided with collapsible reflecting system is the transmitting station.

3. A combined theodolite and telemeter as claimed in claim 1, wherein and reflecting systems comprise reflecting surfaces lying substantially at 45° with reference to said pivotal axis.

4. A combined theodolite and telemeter as claimed in claim 3, comprising stationary casings for the two stations having sides adjacent each other, each provided with an opening registering with the pivotal axis, the reflecting surface in the station other than the one in which the reflecting surface is shiftable being partly transparent to allow, upon shifting of the last-mentioned reflecting surface into its collapsed position, a direct optical connection between the two stations through the openings in the casing sides for telemetric gauging purposes.

5. A combined theodolite and telemeter as claimed in claim 1, wherein the means for shifting the reflecting system in said one station includes a galvanometer having a movable section which is rigid with said reflecting system and means feeding said galvanometer with current to angularly move its movable section thereby to shift said reflecting surface into its collapsed position.

References Cited

UNITED STATES PATENTS

| | | | |
|---|---|---|---|
| 2,541,193 | 2/1951 | Bolsey | 88—15 X |
| 2,976,760 | 3/1961 | Callahan | 33—71 X |
| 3,315,680 | 4/1967 | Silber Trust et al. | |

OTHER REFERENCES

C. E. Granquist, "The Geodimeter—an Electronic 'Eye' for Measuring Distance," Tele-Tech and Electronic Industries, September 1954, pp. 68–69 and 146–148.

ARCHIE R. BORCHELT, Primary Examiner

C. M. LEEDOM, Assistant Examiner

U.S. Cl. X.R.

33—66, 71; 250—216, 227